Figure 1:
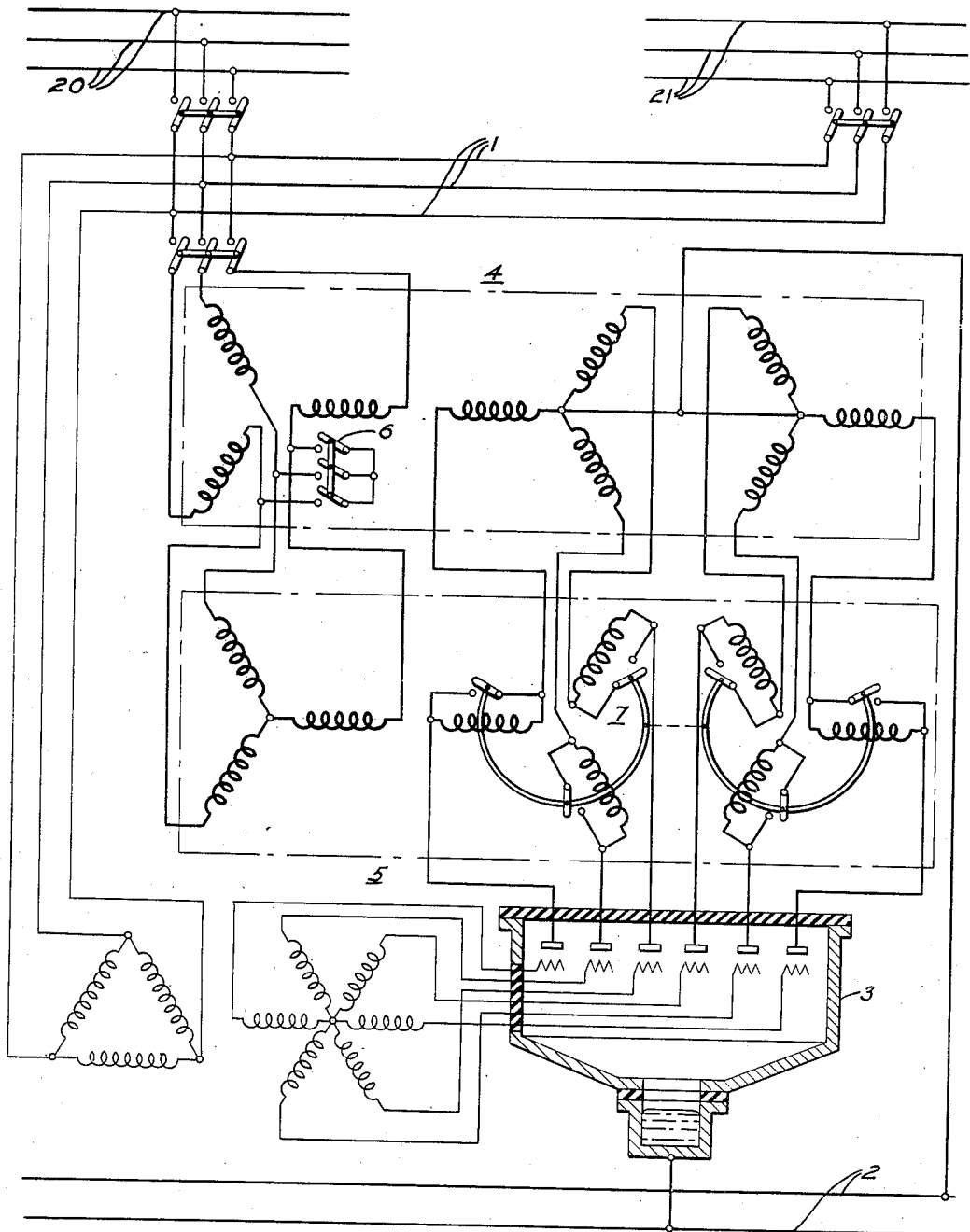

Patented Jan. 21, 1941

2,229,460

UNITED STATES PATENT OFFICE 2,229,460

CONVERTER SYSTEM

Erwin Kübler, Berlin-Siemensstadt, Gerhard Schröder, Merseburg, and Wilhelm Brockmann, Berlin-Charlottenburg, Germany, assignors to Westinghouse Electric & Manufacturing Company, East Pittsburgh, Pa., a corporation of Pennsylvania Application November 29, 1939, Serial No. 306,662
In Germany August 16, 1938

5 Claims. (Cl. 175—363)

Our invention relates to a converter system and particularly to a converter system for operation with supply current of different frequencies.

The invention relates to the current supply of a direct current load circuit from alternating current networks by means of rectifiers which convert the alternating current into direct current potential of the desired magnitude, for example, 600 volts. The invention is based on the problem of constructing the converters with the associated rectifiers and transformers which are to be connected between the alternating current side and the direct current side of the energy supply plant in such a manner that the different requirements arising for a displacement of the operating frequency on the alternating current side from a low frequency to a higher frequency shall be fulfilled. Care must be taken that the converter plants are interchangeably suitable for operation with both frequencies and that for both frequencies, an efficiency as high as possible and the maximum utilization of the rectifiers and transformers used are attained. The converter plant forming the subject matter of the invention is also suitable for current supply plants in which during operation permanently one and the same train network may be interchangeably supplied either from an alternating current network of high frequency or from an alternating current of low frequency. Also here care must be taken that the converter plant operates with the maximum efficiency and good utilization of apparatus in spite of the difficulties introduced by the two frequencies.

The above characterized problem is attained in accordance with the invention by connecting two transformers between each of the rectifiers feeding the train network and the alternating current network, of which each transformer is dimensioned for the complete rectifier power rating during operation with the high frequency and the secondary windings are connected in series. The invention applies, in this connection, for plants in which the two frequencies under consideration are substantially in the ratio of 1:2.

The essential feature of the circuit resides in the fact that with each converter plant, two transformers are associated. Each of these two transformers is, in addition, so dimensioned that it can take care of the complete power rating of the rectifiers during operation with the higher frequency. The problem of interchangeable operation for the two different frequencies is thereby solved by first connecting the secondary windings of both transformers in series. For the primary windings, there are two different possible connections for solving of the problem with which we are confronted. One of these possibilities consists in the fact that for the operation with lower frequency, both transformers are connected on the primary side as well as on the secondary side in series, while for operation with the higher frequencies, the windings of one transformer on the primary and secondary sides are short circuited or are electrically removed from operation by other means. The second possibility for the connection of the primary windings consists in the fact that for operation with the smaller frequencies, the primary windings are not connected in series, but in parallel, while for operation at the higher frequencies, one of the two transformers is short circuited on the secondary side and on the primary side is disconnected, while in the other transformer, in each phase on the primary side, half of the winding is connected in parallel circuit to the network with the other half of the winding, in contrast to the previous series connection.

Figure 2:
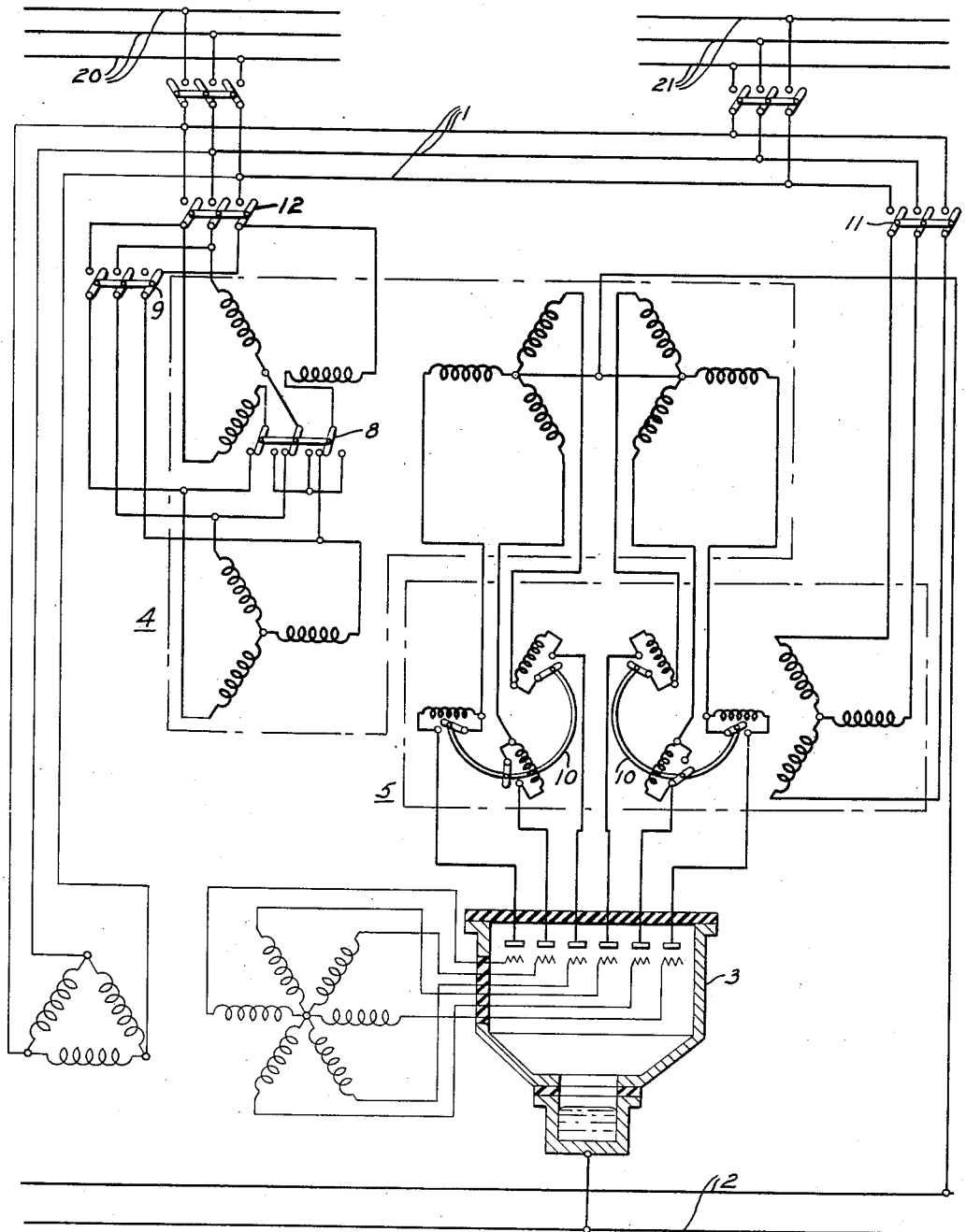

The two circuit possibilities for the rectifier transformers are explained more in detail with reference to the drawings, in which:

Figure 1 is a schematic illustration of a converter system according to our invention; and Fig. 2 is a similar illustration according to our invention.

In Figure 1, I signifies a bus bar which may be connected selectively to alternating current networks 20 or 21 of different frequencies, for example, to two alternating current networks at 50 and 25 cycles per second. The bus bar 2 of the direct current network is supplied by the rectifier 3. With the rectifier 3, two transformers 4 and 5 are associated and they are so dimensioned that each transformer 4 or 5, during operation with the higher frequency, is capable of carrying the full rectifier power. The windings of the two transformers are connected in series on the primary and secondary sides. This series connection is used during operation if the plant is supplied with the smaller frequency.

For the change-over to the higher frequency, the primary winding of transformer 5 is short circuited by a change-over switch 6 and the secondary winding of this transformer 5 is short circuited by a further change-over switch 7. In this case, the rectifier is operated only through the transformer 4. In lieu of short circuiting through the two switches 6 and 7, other circuit devices may be used by which the windings of the transformer are completely disconnected. It is essential for the circuit that for operation at the smaller frequency both transformers are connected on the primary and secondary sides in series, while for the operation with a higher frequency, one of the two transformers is electrically completely disconnected.

Fig. 2 shows a second possibility for the circuit of the primary winding of the two transformers. Circuit parts of Fig. 2, which correspond to those of Fig. 1, are provided with the same reference identifications.

Also in this case, two transformers are associated with the rectifier 3, the secondary windings of which are connected to the anodes of the rectifier in series circuit. In distinction from the circuit according to Fig. 1, the primary windings of the transformers 4 and 5 are connected in parallel with the feeding alternating current network 1. In one of the two transformers in the exemplary embodiment, the transformer 4 has a separate connection on the primary side to the extent that each of its phases is sub-divided into two halves which selectively may be connected in series or parallel circuit to the network 1. To change over, the two change-over switches 8 and 9 serve. For operation with the smaller frequency, the secondary windings of the two transformers are connected in series and the primary windings are connected in parallel to the alternating current network. For operation at the higher frequency, the secondary windings of the transformer 5 are short circuited by the change-over switch 10. The primary winding of transformer 5 is disconnected from the network 1 by the switch 11. The primary winding of transformer 4 remains through the switch 12 on the network; however, the two sectional windings of each primary phase of the transformer 4 is changed over by the two change-over switches 8 and 9 from the previous series circuit to a parallel circuit. The switch 8 forms the new star point for the both halves of the windings, while the switch 9 connects the lower winding halves separated by the switch 8 in parallel circuit to the network.

It should be mentioned that preferably in the two circuits of Figs. 1 and 2, locking devices are provided which make certain that the converter plant or a rectifier of the plant may only be connected to the network with the smaller frequency if the different switches are positioned in the switching position determined for the smaller frequency.

In lieu of the star connections of the two transformers, which are assumed in Figs. 1 and 2, another form of the known transformer connections, for example, delta connection, may be used on the primary side. The invention is, in addition, not confined to the assumed phase number of the rectifiers. In case the converter plant is to be operated not only with different frequencies, but also with different potentials, the transformers may be equipped with the taps and the associated potential change-over switches necessary for this purpose.

The invention is of particular significance for train plants in which a substantial number of rectifier substations are built up. Because of the invention, it is possible to use the transformers of substations which are only necessary later in the course of the conversion first as series transformers with the rectifiers which are to be first put into operation. By this method, only a single total transformer rating which corresponds to the total transformer power at 50 cycles need be provided for each train line. A very large saving in capital is attained by this method because as an end result, only completely utilized transformers for 50 cycles shall have been provided. The consumption for the transformers in accordance with the invention requires approximately 60% of the capital for the same potentials of the two alternating current networks which must be used if transformers are to be used which must be capable of delivering the same rectifier power also at 25 cycles.

As further advantage, it is further to be noted that also the losses in the final operation with 50 cycles are as small as possible, that the characteristics for operation at 25 cycles and for operation at 50 cycles are the same, and that the rectifiers in both manners of operation deliver the full power.

We claim as our invention:

1. An electric current conversion system comprising an alternating-current circuit, a direct-current circuit, a valve type converter for controlling the flow of current between said circuits, two alternating-current networks of different frequency, transformer means including two transformers having primary and secondary phase windings for interconnecting said circuits, the primary and secondary phase windings of one transformer being connected in series with the corresponding phase windings of the primary and secondary phase windings of the other transformer, switching means for selectively connecting said networks to said alternating-current circuit and switching means for short circuiting the phase windings of one of said transformers.

2. A converter system comprising a direct-current load circuit, an alternating-current supply circuit, two sources of alternating current, means for connecting either of said sources to said alternating-current circuit, said sources having different frequencies, said frequencies being of a ratio of the order of 1:2, a valve type converter, two transformers connected between said alternating-current circuit and said converter, each of said transformers having sufficient capacity to supply the converter when connected to the source of higher frequency, each of said transformers having primary and secondary windings, said secondary windings being connected in series, switching means for connecting the primary windings of both of said transformers to the alternating current circuit for low frequency operation and switching means for short circuiting one of said secondary windings for high-frequency operation.

3. A converter system comprising a direct-current circuit, an alternating-current circuit, two sources of alternating current power, said sources having different frequencies, means for selectively connecting said sources to said alternating current circuit, a valve type converter for controlling the flow of current between said circuits, two transformers each having a primary and secondary winding, said secondary windings being connected in series with the valves of said converter, switching means for selectively connecting said primary windings to said alternating current circuit, and means for determining the operating condition of one of said secondary windings.

4. An electric current conversion system comprising an alternating-current circuit, a plurality of sources of alternating-current of different frequencies, means for selectively connecting said alternating-current circuit to said sources, a direct-current circuit, transformer means including a plurality of transformers each having primary and secondary windings, the secondary windings of one transformer being connected in star, the secondary windings of the other transformer being connected in series with the windings of the star connected transformer, means for selectively connecting the primary windings to said alternating-current circuit and means for determining the operative condition of the secondary windings connected in series with the star connected secondary windings.

5. An electric current conversion system comprising a direct-current load circuit, an alternating-current supply circuit, two sources of alternating-current, the frequencies of which are at substantially the ratio of 2:1, means for selectively connecting said source to said supply circuit, transformer means including two transformers of substantially similar ratings, each of said transformers including primary and secondary phase windings, the primary and secondary phase windings of one of said transformers being connected in series with the corresponding phase windings of the other transformer and means for rendering the windings of one of said transformers inoperative.

ERWIN KÜBLER.
GERHARD SCHRÖDER.
WILHELM BROCKMANN.